(No Model.) 3 Sheets—Sheet 1.

F. M. SISK.
GIN SAW FILING MACHINE.

No. 326,167. Patented Sept. 15, 1885.

WITNESSES
W. W. Mortimer
E. G. Siggers.

Frank M. Sisk
INVENTOR
by C. A. Snow & Co
Attorneys

N. PETERS, Photo-Lithographer, Washington, D. C.

(No Model.) 3 Sheets—Sheet 2.
F. M. SISK.
GIN SAW FILING MACHINE.
No. 326,167. Patented Sept. 15, 1885.
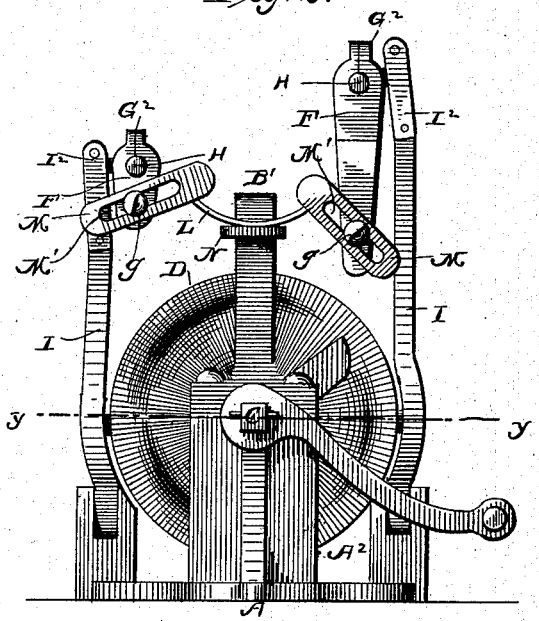
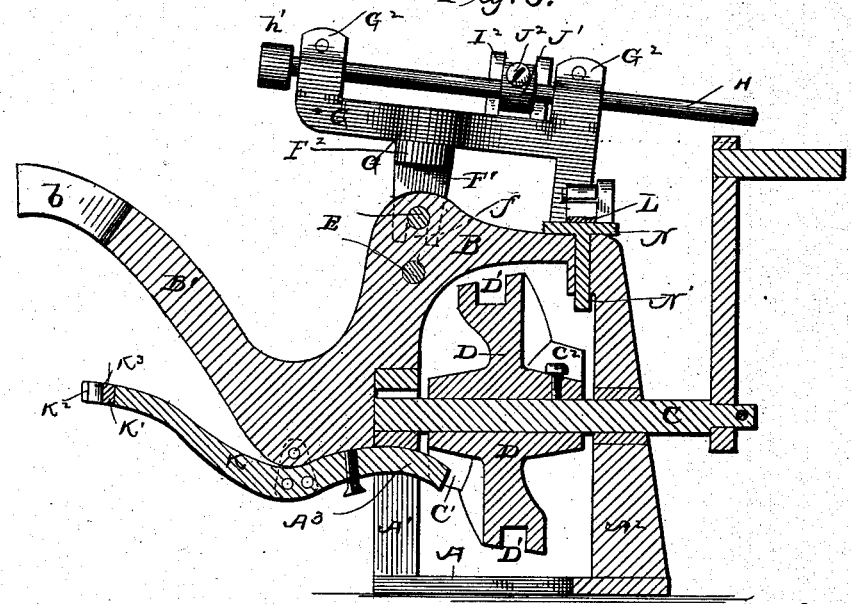
WITNESSES
Frank M. Sisk
INVENTOR
by C. A. Snow & Co.
Attorneys (No Model.) 3 Sheets—Sheet 3.

F. M. SISK.
GIN SAW FILING MACHINE.

No. 326,167. Patented Sept. 15, 1885.

WITNESSES
G. B. Karnes
E. G. Siggers

F. M. Sisk
INVENTOR by C. A. Snow & Co.
Attorneys

UNITED STATES PATENT OFFICE.

FRANK M. SISK, OF NEWNAN, GEORGIA.

GIN-SAW-FILING MACHINE.

SPECIFICATION forming part of Letters Patent No. 326,167, dated September 15, 1885.

Application filed August 30, 1884. (No model.)

*To all whom it may concern:*

Be it known that I, FRANK M. SISK, a citizen of the United States, residing at Newnan, in the county of Coweta and State of Georgia, have invented a new and useful Improvement in Gin-Saw-Filing Machines, of which the following is a specification, reference being had to the accompanying drawings.

My invention relates to that class of saw-sharpening machines in which files are caused to reciprocally operate on opposite sides of the teeth of the saw, and is particularly designed with reference to improvements on the machine for a similar purpose for which patent was granted me April 8, 1884, No. 296,471.

The object of my invention is to so form the operating-wheel and connect same with the file-driving levers that said levers may be driven by a single wheel.

Another object is to so arrange the feed-bar that it may be operated and retracted without involving the use of springs.

The invention has for its object other improvements, as will be more fully described hereinafter.

The invention consists in certain novel constructions and combinations of parts, which I will now describe.

Figure 1:
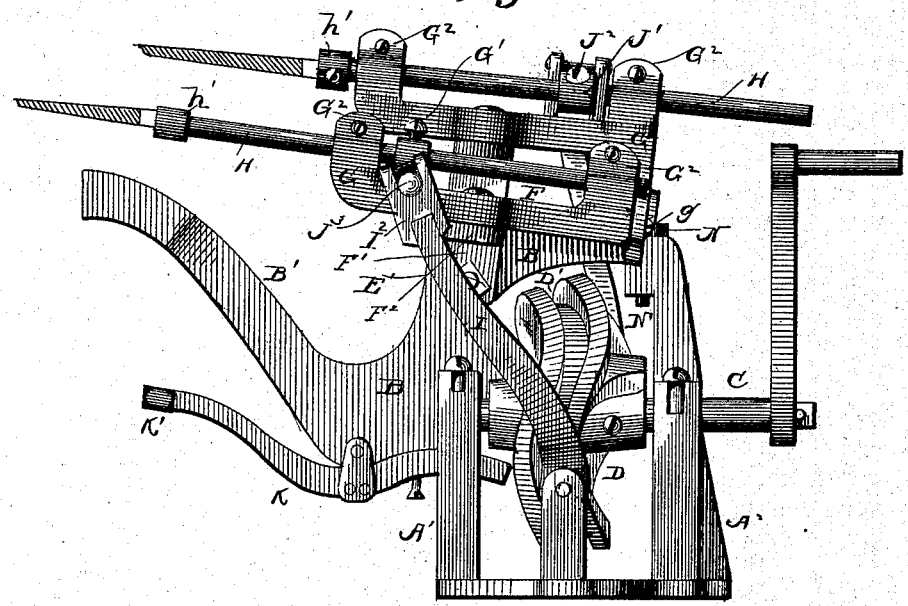
Figure 4:
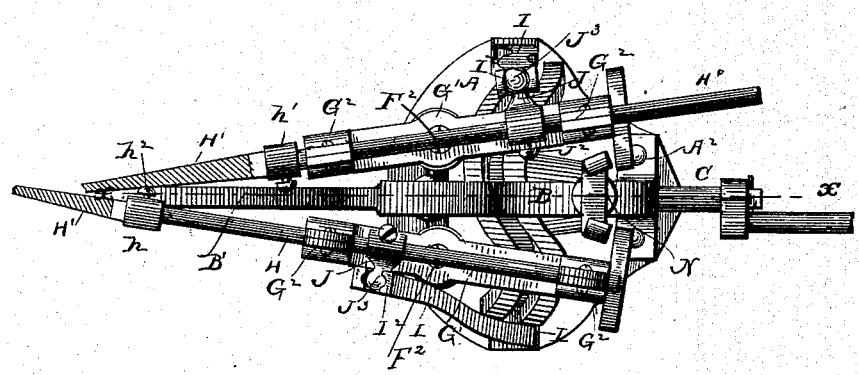
Figure 5:
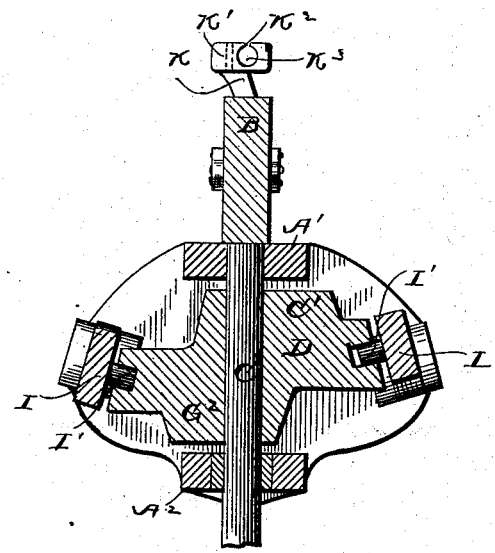
Figure 6:
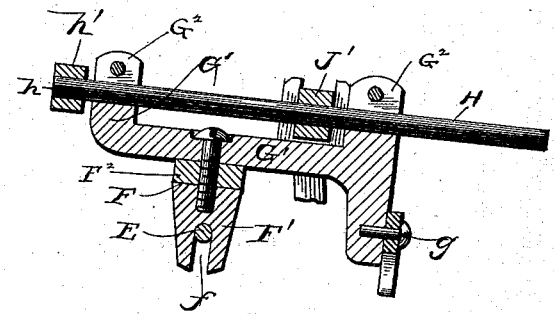
Figure 7:
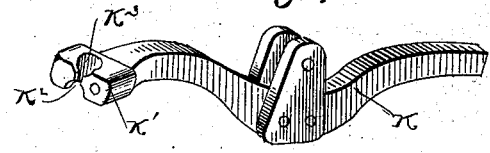

In the drawings, Figure 1 is a side elevation; Fig. 2, a rear elevation; Fig. 3, a longitudinal section on the line $x\ x$ of Fig. 4. Fig. 4 is a top view. Fig. 5 is a horizontal sectional view on the line $y\ y$ of Fig. 2. Fig. 6 is a detail sectional view through one of the file-bars, and Fig. 7 is a detail view.

In constructing the framing for my machine I employ a base, A, on the forward and rear edges of which I mount uprights or standards $A'\ A^2$. This forms the lower section of the frame, and the upper section is composed of the arch B, bolted on the upper ends of standards $A'\ A^2$, and provided with the forwardly-projected arm B', which serves as a brace for the saw, and is provided in its extremity with a slot, $b$, fitted to receive the edge of the saw and hold same from lateral vibration under the action of the files. I prefer to cast the upper and lower sections separately, and bolt them together, as shown. The shaft C has bearings in the main frame, preferably at the joints of the sections, because they are most conveniently formed at such points. I provide this shaft at its rear end with a crank or other expedient by which it can be given rotary motion. On this shaft, between the standards $A'\ A^2$, I key the operating-wheel D, which is formed with a waved or cam edge, and has a groove, D', cut continuously around it in such edge. The construction of the wheel and the slot or groove therein is clearly shown, and it will be seen that as the wheel is revolved a pin or stud projected into the groove D' will be caused to traverse alternately back and forth in a line parallel to the axis of the wheel. It will also be noticed that the wheel is formed with its diametrically-opposite edges waved toward the opposite sides, so that parts engaged by said wheels at points diametrically opposite will be thrown one in one and the other in the opposite direction at the same time.

The arch B is provided near its forward end with two lateral bolts, E, on which are secured, by means of nuts $E'\ E'$, the brackets F. These brackets are composed of the shanks F', slotted at $f$, and fitting over bolts E between nuts $E'$, and broad, flat heads F² are formed at the upper ends of the shanks F', on which are journaled the guide-supports G for the file-bars. I form these supports of the bar G' journaled midway its ends on the bracket F, and the perforated lugs $G^2$ projected upward from the opposite ends of the bar G'. It will be noticed that I employ two each of the lateral bolts, the brackets and the file-bar guides as well as of the file-bars H; but as each one of the pairs of parts is constructed alike it is only necessary to describe one. The file-bars H are held and movable longitudinally through the parts $G^2$ of the support G, and are provided in their forward ends in one side with grooves $h$, conformed to and fitted to receive the files H', which are placed at their rear ends in the grooves $h$, and clamped in such position by the collars $h'$, embracing the file and its bar, and the clamping-screw $h^2$, turned through the collar and bearing against the file. The file-supports are arranged one slightly above the other, which prevents them from coming into contact in the operation of the machine. Ordinarily these supports are arranged at about the angle shown; but it may be varied at will by means of slot $f$ of the bracket and set-nuts $E'$ on bolt E.

The levers I are pivotally secured at their lower ends to the base, and are provided with studs or pins I', projecting into the edge groove of the cam-wheel. These pins, when desired, may be supplied with anti-friction sleeves to render the operation easier and smoother. These levers are, it will be seen, arranged on opposite sides of the wheel D, and by their connections with same are rocked or vibrated reversely on their respective pivots. To the upper ends of the levers are pivoted short bars $I^2$. These bars $I^2$ have their lower ends pivoted to the upper extremities of the levers, and they are rigid with the levers in the direction of motion of the latter, but are free to move or swing at their upper ends transverse said direction. In the upper ends of bars $I^2$, I form ball-sockets fitted to receive the ball-heads on the connecting-arms J. These arms connect the bars $I^2$, which form practically a section of the lever and the file-bar, and are secured to the file-bar by a sleeve, J', embracing said bar, and a screw, $J^2$, turned through the sleeve and bearing against the bar, so the arm may be secured to the file-bar at any desired point. On their other or outer ends the arms J have ball-heads $J^3$, secured in the sockets formed in the ends of the bars $I^2$. Instead of the ball and socket, the arm and bar $I^2$ might be connected by a simple pivot.

The feed-bar K is pivoted under the arm B', close to the standard A', and extends rearwardly through a suitable opening, $A^3$, in said standard, and its rear end is arranged in position to be engaged and depressed at intervals by a wiper-cam, C', secured on the shaft C in front of wheel D, and preferably formed integral with said wheel, as shown. By this cam the rear end of the feed-bar is depressed at intervals as the shaft is revolved. The forward end of the feed-bar is made heavier than the rear portion, so it automatically rises at said rear end between each depression by the cam. The depression of the rear end elevates the forward end, on the extremity of which I pivot at one end the pawl K', which is extended laterally from bar K, and has formed in its forward side a narrow slot, $K^2$, leading into a wider opening, $K^3$. The teeth of the saw are passed through the slot $K^2$ and rest in opening $K^3$, the walls of slot $K^2$ binding the saw in rear of the teeth by means of the eccentric pivot of the pawl. Thus the saw is fed forward at each operation of the feed-bar, and the teeth are secured from damage within the opening $K^3$.

The file-supports G are connected at their rear ends by spring L and links M M. The spring L is a bar-spring, curved as shown, and depressed or curved downward at the center and up at each end, at which points I secure one end of links M. These links are provided with longitudinally-elongated slots M', and are adjustably secured to the supports G by screws g, turned through the said slots into the supports. I provide the upper one of the supports with a depending arm, to which the slotted link is secured. By this spring the supports, and consequently the file-bars, are given such tension as is desirable in the operation of the device.

A presser or head, N, is arranged below the spring L, and the latter normally bears on said head and holds it against the arch. I provide said head with a stem, N', which projects down through the arch, and is extended below the arch in position to be engaged by a wiper-cam, $C^2$, similar to cam C', and arranged on the rear side of the wheel D, and projected in a direction opposite the cam C'. This cam, it will be seen, elevates stem N' and head N, which expands the spring L and clears the files from the saw at the time the feed mechanism is operated to cause the saw to move forward. This releasing of the tension or bearing of the files at the time the saw is moved forward is secured by the relative arrangement of the wiper-cams C' $C^2$, as will be seen.

In operation, as the wheel is revolved it actuates both levers, which in turn operate each file-bar; the levers, swinging in an arc, change positions with reference to the line of the file-bar, and consequently give said parts a partial rotation as they are advanced and drawn back, by which I file the teeth round, as by hand.

The brackets F may be moved back or forth and adjusted nearer to or farther from the arch-support to vary the throw or operating direction of the file-bars. By means of the slotted links M M the rear ends of the file-bar supports may be adjusted with reference to each other, and the position and tension of the files may be regulated. It is manifest that the number of waves of wheel D may be varied at will.

The wiper-cam C' is so arranged and formed, in connection with the pivoted feed-bar, as to move the saw forward one tooth at each revolution of the operating-wheel.

In use the saw is mounted on a suitable support in front of the sharpening apparatus, and the latter is secured to the floor or other support by means of a bolt passed through a longitudinal slot, $A^4$, in the base A, so the machine can be conveniently adjusted toward the saw or away therefrom, as may be desired.

Having thus described my invention, what I claim, and desire to secure by Letters Patent, is—

1. In a machine for sharpening saws, the combination of the operating-wheel having its edge waved and provided with a continuous cam-groove in said edge, the levers pivoted at their lower ends, one on each side of the wheel and extended above same, and provided with pins or studs projected into the cam-groove thereof, the file-bar supports, the file-bars held and movable in the supports, and the arms connecting the file-bars and levers, substantially as set forth.

2. In a machine for sharpening saws, the combination of the operating-wheel having its edge waved and opposite diametrical points of it being swelled in opposite directions, the pivoted levers engaged with said wheel in a diametrically-opposite line, whereby they are reciprocally operated, and the file-bars held movably in suitable supports and connected with and actuated by the levers, substantially as set forth.

3. In a machine for sharpening saws, the combination of the supports pivoted midway their ends to the framing, the file-bars held and movable in said supports, the slotted links held adjustably to the supports, and a spring connecting said links and the necessary operating mechanism, substantially as set forth.

4. The combination of the framing, the bolts E E, having nuts E' E', the brackets F, formed with slots $f$ and placed on the bolt E between nuts E' E', the supports G G, pivoted on the brackets F, the file bars, and the necessary operating mechanism, substantially as set forth.

5. The combination of the shaft C, having cams C' C$^2$ and cam-wheel D, the feed-bar K, the supports G G, the file-bars, the levers, the spring L, links M M, and presser or head N, having stem N', all arranged and operating substantially as set forth.

6. The combination, with the pivoted lever and operating means therefor, of the pawl K', having slot K$^2$ and opening K$^3$, communicating with slot K$^2$, the said pawl being pivoted eccentrically to the extremity of the feed-bar, substantially as set forth.

7. The combination of the wheel D, having cam-groove D', the levers I, provided with pins or studs I', the bars I$^2$, the supports, the file-bars, and the connecting-arms J, connecting the file-bars and the bars I$^2$, substantially as set forth.

In testimony that I claim the foregoing as my own I have hereto affixed my signature in presence of two witnesses.

FRANK M. SISK.

Witnesses:
T. J. HOLLIS,
Z. T. DAVIS.